United States Patent [19]
Fix et al.

[11] Patent Number: 6,055,088
[45] Date of Patent: Apr. 25, 2000

[54] GLAZING WITH VARIABLE OPTICAL AND/OR ENERGETIC PROPERTIES

[75] Inventors: Renaud Fix; Olivier Guiselin, both of Paris; Xue Yun Lin, Fontenay Aux Roses, all of France

[73] Assignee: Saint-Gobain Vitrage, Courbevoie, France

[21] Appl. No.: 08/916,234

[22] Filed: Aug. 22, 1997

[30] Foreign Application Priority Data

Aug. 22, 1996 [FR] France .................................. 96 10344

[51] Int. Cl.[7] ........................................................ G02F 1/15
[52] U.S. Cl. .......................... 359/265; 359/267; 359/273; 359/275
[58] Field of Search ............................. 359/265, 267–275

[56] References Cited

U.S. PATENT DOCUMENTS

| | | | |
|---|---|---|---|
| Re. 34,469 | 12/1993 | Cogan et al. ............................ | 359/267 |
| 3,578,843 | 5/1971 | Castellion ............................... | 359/267 |
| 4,749,261 | 6/1988 | McLaughlin et al. .................... | 349/16 |
| 4,927,246 | 5/1990 | Ito et al. ................................ | 359/275 |
| 5,239,406 | 8/1993 | Lynam ................................... | 359/275 |
| 5,523,877 | 6/1996 | Lynam ................................... | 359/275 |

FOREIGN PATENT DOCUMENTS

| | | |
|---|---|---|
| 0 028 147 | 5/1981 | European Pat. Off. . |
| 42 17 416 | 2/1994 | Germany . |

*Primary Examiner*—Georgia Epps
*Assistant Examiner*—Evelyn A. Lester
*Attorney, Agent, or Firm*—Oblon, Spivak, McClelland, Maier & Neustadt, P.C.

[57] ABSTRACT

A glazing is described, which includes at least one active layer and at least one reflecting coating on the active layer. A pane, partition, mirror, or door is also described that includes the glazing. A method for making is also described. The glazing exhibits superior thermal and radiative durability, and is capable of modulating the optical appearance of the active layer.

13 Claims, 2 Drawing Sheets

GLAZING WITH VARIABLE OPTICAL AND/OR ENERGETIC PROPERTIES

BACKGROUND OF THE INVENTION

1. Field of the Invention

The present invention relates to glazings with variable optical/energetic properties. It relates more precisely to glazings whose characteristics can be modified, for example, under the effect of an electrical supply, for example, light diffusion or the transmission within some wavelengths of the electromagnetic spectrum, especially in the infrared and/or in the visible, or under the effect of a particular radiation.

2. Discussion of the Background

An increasingly growing demand exists for so-called "intelligent" glazings, or glazings whose properties can be modulated at will, in order to take various changing parameters into account. It is highly advantageous to be able to control the input of sunlight through glazings fitted externally in buildings, motor vehicles, or trains, in order to avoid excessive heating of the rooms or compartments in the event of strong sunshine. Similarly, it may be useful to control the degree of vision through glazings, for example in the case of glazings employed as internal partitions between two rooms, in a building, or between two compartments in a train or an aircraft. Many other applications also exist for such glazings: for example, rearview mirrors in vehicles which, by becoming darker when required, can prevent dazzling of the driver, or road or urban sign panels displaying mileages or designs only intermittently in order to attract attention better.

The interest in such glazings accounts for the fact that many such systems have already been studied.

One of the known systems that make it possible to modulate the light transmission or absorption of glazings are especially the so-called viologen systems like those described in U.S. Pat. No. 5,239,406 or in Patent EP-A-0 612 826. The latter makes it possible to obtain a variable absorption essentially in the visible range.

For the same purpose there are also the so-called electrochromic systems, which include a layer of an electrochromic material capable of reversibly and simultaneously inserting cations and electrons, and whose oxidation states corresponding to the inserted and disinserted states have different colors, one of the states exhibiting a higher light transmission than the other. The insertion or disinsertion reaction in driven by a suitable electric supply with the aid of a current generator or a voltage generator. The electrochromic material, usually tungsten oxide-based, is placed in contact with a source of electrons, such as a transparent electrically conductive layer, and a source of cations, such as an ionically conductive electrolyte.

To ensure at least about a hundred switchings, the layer of electrochromic material must be combined with a counterelectrode, itself also capable of reversibly inserting cations, symmetrically in relation to the layer of electrochromic material, so that, macroscopically, the electrolyte appears to be a simple medium for the cations.

The counterelectrode must consist of a layer which is either neutral in color, transparent, or weakly colored when the electrochromic layer is in the faded state. Since tungsten oxide is a cathodic electrochromic material, that is to say its colored state corresponds to the most reduced state, an anodic electrochromic material such as nickel oxide or iridium oxide is generally employed for the counterelectrode. It has also been proposed to employ a material which is optically neutral in the oxidation states involved, such as, for example, curium oxide, or organic materials like electronically conductive polymers (polyaniline, etc.) or Prussian blue.

The description of such systems will be found, for example, in European Patents EP-0 338 876, EP-0 408 427, EP-0 575 207 and EP-0 628 849.

At present these systems can be classified into two categories, according to the electrolyte type employed:

1. either the electrolyte is in the form of a polymer or of a gel, for example a proton-conducting polymer like those described in European Patents EP-0 253 713 and EP-0 670 346 or a polymer conducting lithium ions, such as those described in Patents EP-0 382 623, EP-0 518 754 and EP-0 532 408; or
2. the electrolyte is an inorganic layer, ionically conductive but electronically insulating; "all-solid" electrochromic systems is the term which is then employed. For the description of an "all-solid" electrochromic system reference may be made to French Patent Application FR-96/03799 filed on Mar. 27, 1996.

These systems containing reversible-insertion material(s) are particularly advantageous in the sense that they allow the absorption to be modulated in a wider range of wavelengths than the viologen systems; they can absorb in a variable manner not only in the visible but also in the infrared, and this enables them to assume an efficacious optical and/or thermal function.

The viologenic or electrochromic systems deposited or combined with transparent substrates form glazings whose light absorption and transmission (as well as the energy transmission) can vary within given ranges. The ranges are typically determined by the choice of the electrochromic materials employed and/or their thickness.

Another type of "intelligent" glazing includes what is referred to by the term of optical valve: this is a film including a matrix of generally crosslinked polymer(s) in which are dispersed microdroplets containing particles which can orient in a preferred direction under the action of an electric or magnetic field.

The above film exhibits variable optical properties as a function of the electrical potential applied to the terminals of the conductive layers placed on both sides of the film and of the concentration and the nature of the orientable particles.

Thus, Patent WO-93/09460 discloses an optical valve based on a film including a matrix made of crosslinkable polyorganosilane and inorganic or organic orientable particles, more particularly light-absorbing particles such as polyiodide particles. When a voltage is applied to the film, the particles intercept the light much less than when there is no voltage.

A glazing which operates on a similar principle is also known under the term of liquid-crystal glazing. It is based on the use of a film placed between two conductive layers and based on a polymeric material in which are dispersed droplets of liquid crystals, especially nematic with positive dielectric anisotropy. When a voltage is applied to the film the liquid crystals orient themselves along a preferred axis, and this permits vision. With no voltage, in the absence of alignment of the crystals, the film becomes diffusing and prevents vision.

Examples of such films are described in European Patent EP-0 238 164 and U.S. Pat. No. 4,435,047, U.S. Pat. No. 4,806,922 and U.S. Pat. No. 4,732,456. Films of this type, once laminated and incorporated between two glass substrates, are marketed by Saint-Gobain Vitrage under the trade name "Priva-lite".

All the liquid-crystal devices known under the terms of "NCAP" (Nematic Curvilinearly Aligned Phases) or "PDLC" (Polymer Dispersed Liquid Crystal) can in fact be employed.

It is also possible to employ, for example, gels based on cholesteric liquid crystals containing a small quantity of crosslinked polymer, like those described in Patent WO-92/19695.

So-called photochromic glazings also exist in which the property of absorption in the visible and possibly in at least a portion of the infrared can be modulated under the effect of energetic radiation, generally situated in the ultraviolet. There are mainly two classes of these; the first employs silver salts, especially silver halides, as the active components, for example, in a glassy matrix, halides which by absorption in the ultraviolet are converted reversibly into a form of metal aggregates. The second class employs as the active components organic dyes that are generally dispersed in a polymer matrix, especially compounds derived from spiroxazines and spiropyrans. These compounds are isomerized reversibly by absorption in the ultraviolet.

However, all of the above glazings exhibit intrinsic limits with respect to their thermal behavior and to their optical appearance.

In fact, these glazings, mentioned above, include a plurality of electrically and/or electrochemically active components whose durability can depend on the temperature to which they are subjected. In the particular case of the glazings with variable light transmission, such as electrochromic glazings, when they are in the colored state they are highly absorbent with regard to energy. Thus, when they are employed as external glazings, and even more so if they are fitted inclined in relation to the vertical (which is the case with motor vehicle glazings such as car roofs or glazings for building roofing), they can, in the colored state, heat up to high temperatures reaching 80° C. when exposed for long enough to strong sunshine. Such temperatures can cause a shortening of the lifetime of the glazings by progressive irreversible degradation of one or other of their electrochemical components.

The same type of problem can also arise in the case of glazings with variable light diffusion, like liquid-crystal glazings. Firstly, beyond a certain temperature, called the clearing point, the liquid-crystal polymer composite, converted to a diffusing state, can spontaneously revert to the transparent state. Subsequently, if a dichroic dye has been added to the composite in order to make it possible to modulate both the light diffusion and a transmission of the glazing, this type of dye exhibits some degree of instability in the ultraviolet region, an instability that increases with temperature.

Photochromic glazings also have a disadvantage linked with their heating. In fact, the two classes of photochromic glazings referred to above become tinted under the effect of ultraviolet light: an "unstable" state. The return to the faded, "stable" state is obtained by a process which is heat activated. Under the effect of ultraviolet light these glazings take on color, become absorbent and therefore heat up. In strong sunshine the heating becomes excessive and tends to make the glazings revert to their faded stable state, and the "available" contrast decreases.

Furthermore, the optical appearance of the above glazings may not be fully satisfactory, depending on the intended applications. Thus, when a whole facade of a building is fitted with electrochromic glazing, it gives an overall appearance which is somewhat somber when all of it is in the colored state. It could also be advantageous to adjust the reflection appearance of an electrochromic glazing on a car according to the color of the external bodywork. Similarly, in the diffusing state, glazings containing liquid crystals offer a milky white appearance (in the absence of dye) which is identical regardless of the side on which a viewer is placed. Thus, it could be advantageous to be able to do away with this symmetry of appearance for aesthetic reasons.

Thus, there is a need for new glazings with variable optical and/or energetic properties that overcome these disadvantages and are capable of being controlled electrically or photochromically, which exhibit a greater thermal durability and/or whose optical appearance can be modulated to a greater extent.

SUMMARY OF THE INVENTION

The first object of the present invention is to provide new glazings with variable optical and/or energetic properties that overcome the above disadvantages and are capable of being controlled electrically or photochromically, which exhibit a greater thermal durability and/or whose optical appearance can be modulated to a greater extent.

Another object of the present invention is to provide a glazing that includes one means of thermal protection for the active variable optical system.

Another object of the present invention is to provide a glazing that includes a means to adjust the optical appearance imparted to the glazing by the active variable optical system.

Another object of the present invention is to provide a glazing in which excessive heating of the active system is prevented.

Another object of the present invention is to provide an "intelligent" glazing that can be fitted externally to buildings or vehicles and can be exposed to long periods of sunshine.

Another object of the present invention is to provide a glazing in which the photochromic properties have an extended lifetime, and are not degraded with excessive heating or exposure to radiation.

Another object of the present invention is to provide an "intelligent" glazing having exceptional durability to visible, ultraviolet, and infrared radiation.

These and other objects of the present invention have been achieved with a glazing that includes at least one active layer and at least one reflecting coating.

The first embodiment of the present invention therefore relates to a glazing, which includes:
  at least one active layer, and
  at least one reflecting coating on said active layer.

The second embodiment of the present invention relates to a pane, partition, mirror, or door, that includes:
  a glazing, containing at least one active layer and at least one reflecting coating.

The third embodiment of the invention relates to a method of making a glazing, that includes:
  coating at least one reflecting coating onto the surface of an active layer.

BRIEF DESCRIPTION OF THE PREFERRED EMBODIMENTS

Various other objects, features and attendant advantages of the present invention will be more fully appreciated as the same becomes better understood from the following detailed description of the preferred embodiments, which are not intended to be limiting thereof.

The subject-matter of the invention preferably relates to a glazing that includes at least one active layer or system with variable optical and/or energetic properties, especially electrically controllable of the variable light transmission/ absorption system type or of the variable light diffusion system type or of the photochromic type. This glazing additionally includes at least one means of thermal protection for the electrically controllable system and/or of adjustment of the optical appearance imparted to the glazing by the electrically controllable system. This means is advantageously in the form of at least one coating with reflective properties in the infrared and/or in the visible and/or in the ultraviolet.

Depending on its configuration in the glazing, this reflecting coating can, in fact, assume two functions alternatively or cumulatively.

When the coating is placed in the glazing so that, once the glazing is fitted, it is between a source of heat and the active (electrochemical) system, it acts as a thermal screen, reflecting all or part of the energy emitted by the source of heat. It thus prevents an excessive heating of the active system of the electrochemical type. The most advantageous application relates to glazings fitted externally to buildings or vehicles and intended to be exposed to long periods of sunshine. It relates very particularly to electrochromic glazings which, in the colored state and in the absence of heat "filter", can be heated strongly by energy absorption, the heating being detrimental to the lifetime of the glazing and even because of safety problems, it being possible for the surface temperature of the glazing to reach 80° C. without a heat filter.

It also relates to the active glazings of the photochromic type which, as mentioned above, tend to lose their properties in the event of excessive heating.

This has two very advantageous consequences:

on the one hand, the invention makes it possible to lengthen the lifetime of the "intelligent" glazings which were already intended for external applications. This is commercially and technically highly advantageous, both in the field of building construction, where the builders must guarantee lifetimes of the materials employed of at least 5 or 10 years, and in the motor vehicle sector, where strict safety standards apply, especially in terms of optical quality;

on the other hand, the invention makes it possible to envisage "intelligent" glazings for external applications, hitherto employed essentially internally for reasons of excessively poor thermal durability, and/or of instability towards certain radiations, which is, for example, the case with some liquid-crystal glazings employing dichroic dyes which are relatively unstable to ultraviolet radiations.

A very advantageous optical function can also be imparted to the reflecting coating according to the invention by selecting it so that it modulates the optical appearance and hence the aesthetics of the glazing. Two highly advantageous types of optical modulations can be thought of, no limitation being implied.

In the case of glazings with variable light transmission/ absorption of the electrochromic type, it has already been seen above that the type of electrochemical system chosen makes it possible to set the limits between which the light transmission or absorption of the glazing would be able to vary. The same applies to the choice of the colorimetric appearance of the glazing. Thus the choice of an electrochromic system employing tungsten oxide as cathodic electrochromic material will result in a glazing whose color will be in the blue region.

Combining with such a system a reflecting coating whose optical properties can be adjusted precisely, especially through the choice of its composition and of its thickness, allows the optical appearance of the glazing to be adapted in various ways: by appropriately selecting the reflecting coating, the light transmission range of the glazing can be lowered in a controlled manner without appreciably decreasing its contrast (the contrast being defined as the ratio of the light transmission in the completely faded state to that in the completely colored state). In addition, the reflecting coating may have a colorimetric impact on the glazing by modifying its color on either of its faces.

These remarks also apply to the active glazings of the photochromic type: the reflecting coating limits their heating and hence preserves their properties, and can also modulate their optical properties.

Furthermore, the reflecting coating can also be very advantageous where aesthetics are concerned when it is incorporated into a glazing with variable light diffusion of the liquid-crystal type. With glazing of this type an absolutely "symmetric" appearance is generally obtained regardless of the side on which the viewer is placed, a transparent appearance in the nondiffusing state and an appearance which is often in the milky white region in the diffusing state, which is the case with the glazings currently marketed under the name of "Priva-lite" by Saint-Gobain Vitrage. However, for special applications it is now desired to obtain the ability of having a different optical appearance depending on the side where the viewer is placed. The reflecting coating according to the invention makes it possible to obtain this result, since a glazing provided both with the variable light diffusion system and with the reflecting coating exhibits, especially in the diffusing state, a face which will retain the white and milky diffusing appearance, referred to above, as well as an opposite face which, for its part, will have a reflecting appearance that can be modulated in color and intensity by virtue of this coating. Glazing of this type made optically "disymmetric" advantageously finds application, for example, as glazing for a motor vehicle, such as a car roof; from the outside the viewer sees a particularly aesthetic reflecting glazing, whereas from the inside of the compartment the diffusing effect sought after is maintained.

The reflecting coating can be given another function: by appropriately choosing its nature and its thickness it is possible to employ it as an electrically conductive layer of the electrically controllable system.

Many reflecting coatings may be advantageously employed within the scope of the invention. They may be single-layer coatings or may consist of a stack of at least two layers. In general a reflecting layer is involved, which is used in combination with at least one layer of dielectric material intended to protect it from chemical or mechanical attack and/or to adjust its optical properties. A coating is usually employed in the form of at least one reflecting layer placed between two layers (or superpositions of layers) of dielectric material of the metal or silicon oxide or nitride type.

The reflecting layer may be chosen based on at least one of the metals belonging to the following group: silver Ag, gold Au, copper Cu, aluminum Al, chromium Cr, nickel Ni, iron Fe, tantalum Ta, zirconium Zr, zinc Zn, tin Sn, indium In, rhodium Rh, cadmium Cd or silicon Si (it being possible for these metals or metal alloys to be additionally nitrided).

It may also be a reflecting coating based on at least one metal nitride such as titanium nitride TiN, zirconium nitride ZrN or hafnium nitride HfN.

Reflecting coatings meeting this definition and particularly preferred within the scope of the invention are layers based on silver, especially incorporated in a stack of the type:

dielectric/silver/dielectric or
dielectric/silver/dielectric/silver/dielectric, optionally with, between the silver layer and at least one of the adjacent layers of dielectric, thin layers based on partially or completely oxidized metal, intended to act as nucleation layers and/or barrier layers, especially against oxidation.

For further details, reference will be advantageously made especially to Patents EP-506 507, EP-611,213, EP 636,587, EP-638,528, EP-648,342, EP-678,484, EP-709,349 and EP-718,250.

Another preferred reflecting layer glazing according to the invention meeting this definition is a layer based on Ni—Cr alloy or based on Ni—Cr—Fe alloy of the steel type, alloys which are optionally nitrided, or based on tantalum. This layer is placed between two layers of oxide or nitride of the $Ta_2O_5$, $SnO_2$, $TiO_2$ or TiN type, as is described especially in Patent EP-511,901, the entire contents of which is hereby incorporated by reference.

It may also be a layer based on TiN, used in combination with at least one other layer of oxide of the $TiO_2$ or $SiO_xC_y$ type, as is described especially in Patents EP-638,527 and EP-650,9387.

A description of a reflecting layer based on silicon used in combination with a second layer of oxide will also be found in Patent FR-2 391 173.

Also included as another type of reflecting layer are the layers based on optionally doped metal oxide(s), especially based on titanium oxide, like the coating of the glazings marketed under the name "Antelio" by Saint-Gobain Vitrage, or based on fluorine-doped tin oxide $SnO_2$:F or on tin-doped indium oxide ITO. For further details reference may be made, in particular, to Patent FR-2 310 977 for the description of the method of preparation of a titanium oxide layer, or to Patents EP-544 577, EP-573 325 and EP-648 196 corresponding to PCT Application WO 94-25 410 for the description of stacks of layers incorporating an $SnO_2$:F layer. Moreover, it may be noted that if a reflecting layer is chosen based on titanium oxide which is at least partially crystallized in anatase or anatase/rutile form, this type of layer also has properties which are at the same time photocatalytic and hydrophilic, which give it particularly advantageous antimist and/or antisoiling properties if it is deposited on one of the external faces of the glazing. Reference may be made advantageously to Patent FR 95/10 839 filed on Sep. 15, 1995, for further details.

Once the choice of the material of the reflecting layer has been made, its thickness may then be optimized as a function of the desired effect, especially as a function of the degree of "filtration" of the solar radiations which is required or of the modification of optical appearance which in sought after.

The invention applies to various types of active glazings, of the electrochemical type or of the photochromic type. As already seen, it may involve glazings with variable light transmission/absorption, especially with a viologen or electrochromic system, especially of the type of those described in the abovementioned Patents EP-0 338 876, EP-0 408 427, EP-0 575 203 and EP-0 628 849. It is preferably in the form of a stack of functional layers including successively a preferably transparent electrically conductive layer, a so-called cathodic electrochromic layer capable of reversibly inserting cations such as $H^+$, $Li^+$, $Na^+$, and $Ag^+$, an electrolyte layer, optionally a counterelectrode in the form of a second so-called anodic electrochromic layer also capable of reversibly inserting cations and, finally, a second electrically conductive layer.

Insofar as the nature of the electrically conductive layers of the device is concerned, there are two possible alternative forms: it is possible to use materials based on doped metal oxide, such at fluorine doped tin oxide $SnO_2$:F or tin-doped indium oxide ITO. It is also possible to employ layers of metal or metal alloy, for example of gold Au, of silver Ag or of aluminum Al. As the device generally has two electrically conductive layers, they may either both be metallic or both based on doped oxide, or one metal-based and the other doped-oxide-based.

To form the layer of cathodic electrochromic material it is possible to choose a material or a mixture of materials chosen from the group including tungsten oxide $WO_3$, molybdenum oxide $MoO_3$, vanadium oxide $V_2O_5$, niobium oxide $Nb_2O_5$, titanium oxide $TiO_2$ a "cermet" material (combination of metallic and ceramic material, especially in the form of metal particles in a ceramic matrix) such as $WO_3$/Au or $WO_3$/Ag, or a mixture of tungsten and rhenium oxides $WO_3$/$ReO_3$. These materials are especially suitable in the case of reversible insertion of lithium ions. In the case where the device operates by reversible proton insertion, the same materials may be employed, but this time hydrated.

To form the layer of anodic electrochromic material, a material may be chosen which corresponds to the formula $M_xA_yU_z$, with M a transition metal, A the ion employed for reversible insertion, for example an alkali metal or a proton, and U a chalcogen such as oxygen or sulphur.

Especially in the case of an insertion of proton ions $H^+$, it may be a compound or a mixture of compounds belonging to the group including $LiNiO_x$, $IrO_xH_y$, $IrO_xH_yN_x$, $NiO_x$, $NiO_xH_yN_z$, $RhO_x$, $CoO_x$, and $MnO_x$. In the case of a reversible insertion of lithium ions $Li^+$, a compound or a mixture of compounds belonging to the group including $LiNiO_x$, $LiMn_2O_4$, $IrO_x$, $Li_xIrO_y$, $NiO_x$, $CeO_x$, $TiO_x$, $CeO_x$—$TiO_x$, $RhO_x$, $CoO_x$, $CrO_x$ and $MnO_x$ is preferably chosen.

In the formulas above, x, y, and z are not particularly limited, and may each independently be zero, any integer, or fractional value.

Insofar as the choice of the electrolyte material is concerned, there are in fact two types, as has already been mentioned above.

It may be a layer of aqueous liquid such as water containing added sulphuric or phosphoric acid in the case of a reversible insertion of protons, or a layer of anhydrous liquid such as propylene carbonate containing a lithium salt in the case of a reversible insertion of lithium ions. It may also be a layer of gel or polymer, especially proton-conductive polymers of the type of solid solution of polyethylene oxide and of phosphoric acid $PEO-H_3PO_4$ (in this case the polymer also constitutes an electronic insulator) or else based on a polymer obtained by copolymerization of three precursors including two types of grafted trialkoxysilanes and a plasticizer containing at least one urea group. The lithium ion-conductive polymer chosen may be an ionomer obtained by partial neutralization of polyacrylic acid or a polymer based on branched polyethyleneimine and a lithium salt. The nature and the synthesis of such polymeric products is not particularly limited and is generally available in the patents cited in the preamble of the present application.

However, it may also be an electrolyte in the form of a solid material, especially based on metal oxide. According to an alternative form of the invention the system is chosen such that it contains only layers of solid material. In the context of the invention "solid material" is intended to mean any material which has the mechanical behavior of a solid, in particular any essentially inorganic or organic material or any hybrid material, that is to say partially inorganic and partially organic, like the materials which can be obtained by sol-gel deposition from organo-inorganic precursors. A so-called "all-solid" system configuration is then obtained which offers an advantage in terms of ease of manufacture. In fact, when the system contains an electrolyte in the form of polymer which does not have the mechanical behavior of a solid, for example, this in fact makes it necessary to manufacture, in parallel, two "half cells", each having a carrier substrate coated with a first electrically conductive layer and then with a second electrochemically active layer, these two half-cells being subsequently assembled by inserting the electrolyte between them. With an "all-solid" configuration the manufacture is simplified, since all of the layers of the system can be deposited, one after the other, on a single carrier substrate. The electrochromic system/carrier substrate unit is thus made lighter, since it is then possible to be satisfied with a single carrier substrate instead of two, as is usual.

In addition, whether the electrolyte is "solid" or not, it may include a layer of an ionically conductive material capable of inserting ions reversibly, but the degree of oxidation of which is kept essentially constant. It may be especially a material with electrochromic properties, as described in the abovementioned Patent FR-96/03799, the entire contents of which are hereby incorporated by reference.

The system with variable light transmission/absorption of the component according to the invention can thus be found placed either between two rigid substrates or on a rigid mingle substrate more particularly in the case of an "all-solid" system. The rigid carrier substrates are preferably made of glass, acrylic polymer, polycarbonate, or polyurethane.

Regardless of the configuration adopted, provision may additionally be made for laminating the carrier substrate or at least one of the carrier substrates of the electrochromic system through the intermediacy of a sheet of bonding polymer of the PVB (polyvinylbutyral), EVA (ethylene-vinyl acetate) or PU (polyurethane) type.

At least one of the carrier substrates may also be used in combination with another rigid substrate through the intermediacy of a gas interlayer. The glazing then becomes a multiple glazing with reinforced thermal insulation properties, especially a double glazing. This laminated structure may be fitted as insulating double glazing, the sequence then being, for example, glass 1/reflecting coating/sheet of bonding polymer/glass 2/electrochromic system/glass 3/gas interlayer/glass 4. (This multiple glazing configuration can also be adopted when the electrically controllable system is of the liquid-crystal type).

The reflecting coating is preferably placed on the face of one of the carrier substrates which is opposite that facing the side of the active (electrochromic) system or on one of the faces of one of the other substrates of which the glazing consists. It is thus possible to have a glazing exhibiting the sequence:
    glass 1/reflecting coating/sheet of bonding polymer/glass 2/electrochromic system/glass 3. This reflecting coating may alternatively be placed on the face of the glass 2 facing the sheet of bonding polymer or on the external face of the glass 1 if it has sufficient mechanical and chemical durability. This laminated structure may be fitted as insulating double glazing, then, for example, with the sequence glass 1/reflecting coating/sheet of bonding polymer/glass 2/electrochromic system/glass 3/gas interlayer/glass 4.

The glazing according to the invention may also be chosen with variable light diffusion, especially by incorporating the so-called optical valve or liquid-crystal systems which were described above. In the case of liquid-crystal systems the nature of the polymeric matrix and of the crystals is judiciously chosen so that the ordinary index of the liquid crystals $n_o$ is equal to the index of the polymer $n_p$.

Regardless of whether optical valves or liquid-crystal systems are involved, both the systems are in the form of a polymer-based composite film. In order to ensure its electrical supply it is usually placed between two electrically conductive layers, especially transparent ones and of the type of those employed for the electrochromic systems described above.

It should be noted, furthermore, that the droplets of liquid crystals of the polymer-liquid crystal composite may also contain a dye or a mixture of dyes, especially in the form of dichroic dyes, which are dyes exhibiting an absorption anisotropy which can be oriented by the liquid crystals.

In addition, the film with its two conductive layers is usually provided on at least one of its faces, and preferably on each of them, with a carrier substrate. The latter is generally transparent. It may be chosen to be rigid or semirigid, for example may be made of glass, acrylic polymer of the polymethyl methacrylate PMMA type or of polycarbonate PC. It may also be flexible, especially of polyethylene terephthalate PET or based on some flexible polycarbonates. It may thus have a structure of the PET/ITO/polymer-liquid crystal composite/ITO/PET type, which is in the form of a flexible sheet which can be handled with ease. This unit (composite+electroconductive layers+at least one carrier substrate) can be subsequently laminated to at least one transparent rigid substrate of the glass type with the aid of at least one layer of bonding organic polymer of the polyvinylbutyral PVB or ethylene-vinyl acetate EVA type or polyurethane PU.

According to a preferred configuration of this type of glazing with variable light diffusion the reflecting coating according to the invention is placed on the face of one of the carrier substrates facing the side of the system with liquid crystals. However, it may also be placed on the opposite face or on one of the faces of one of the other substrates of which the glazing consists. The glazing can thus have the sequence:
    glass (1) /reflecting coating/sheet of bonding polymer/sheet of flexible polymer/liquid-crystal system/sheet of flexible polymer/sheet of bonding polymer/glass (2). As in the case of the electrochromic glazing, the reflecting coating may alternatively be situated especially on the external face of the glass 1.

Regardless of whether an electrically controllable system of the electrochromic type or of the liquid-crystal type is involved, a double-glazing configuration may be chosen such that the carrier substrate(s) of the electrically controllable system is (are) separated from the substrate provided with the reflecting coating according to the invention by a gas interlayer. There is then a glazing of the type:
    glass 1/reflecting coating/gas interlayer/electrically controllable system used in combination with at least one glass 2.

Whatever the type of electrically controllable glazing envisaged, it may be desired to give it an additional property of decreasing its light and/or energy transmission with a view to proposing a glazing exhibiting enhanced antisunshine properties or else improved visual comfort, an anti-dazzle effect or given colorimetric appearance In this case at least one of the substrates of the glazing may be chosen to be absorbent where light and/or energy is/are concerned, especially in the form of a substrate which is tinted in bulk in a more or less pronounced manner. If the reflecting coating is employed for protection of the electrically controllable system against solar radiation, it is, of course, preferable to configure the glazing so that the substrate which is tinted in bulk is separated from the substrate in contact with the reflecting coating by at least the electrically controllable system, for example with a sequence of the type:

clear glass 1/reflecting coating/ . . . /electrically controllable system of the liquid-crystal type/ . . . /tinted glass 3, the dots representing at least one material of the rigid substrate, sheet of bonding polymer or gas interlayer type.

By fitting the glazing in a building or a vehicle so that in it the clear glass faces outwards, the electrically controllable system in contact with an absorbent glass is prevented from being heated:

when the electrically controllable system has variable absorption, as is the case with an electrochromic system, it is, in fact, liable to be heated by strong sunshine via an energy absorption phenomenon when it is in the colored state, and hence the advantage of the reflecting coating according to the invention (the same comment applies to the photochromes); and/or when the electrically controllable system is of the liquid-crystal type or when it is a system with variable absorption of the electrochromic type which is in the faded state, it is better to avoid it being in contact with a tinted glass subjected directly to sunshine, to avoid its becoming heated by this contact, even if it is not absorbent itself.

Glazings which are tinted in bulk and especially suited to building construction, are, for example, marketed under the name "Parsol" by the company Saint-Gobain Vitrage. Other types of glass with reduced energy transmission are also advantageous within the scope of the present invention:

These are especially glasses of bronze color, as described in U.S. Pat. No. 4,190,542 and U.S. Pat. No. 4,101,705, the entire contents of which are hereby incorporated by reference, or glasses whose composition has been adjusted mainly with a view to a motor vehicle glazing application. They are, for example, glasses called TSA* or TSA**, in which the contents of coloring oxides of the $Fe_2O_3$, FeO and CoO type are adjusted in order to have a selectivity defined by the ratio $T_L/T_E$ of at least 1.30 or even 1.40 to 1.50, and a tint in the green region. Reference will be made advantageously for further details to European Patent Application EP-A-0 616 883. The content of the abovementioned coloring oxides in the glass compositions according to the teaching of this patent will be recalled briefly below (weight proportions).

According to a first series:

| | |
|---|---|
| $Fe_2O_3$ | 0.55 to 0.62% |
| FeO | 0.11 to 0.16% |
| CoO | 0 to 12 ppm, especially <12 ppm especially with the $Fe^{2+}$/Fe ratio of about 0.19 to 0.25. |

According to a second series;

| | |
|---|---|
| $Fe_2O_3$ | 0.75 to 0.90% |
| FeO | 0.15 to 0.22% |

| | |
|---|---|
| CoO | 0 to 17 ppm, especially <10 ppm especially with the $Fe^{2+}$/Fe ratio of about 0.20. |

They may also be glasses tinted in bulk, especially in the blue-green region, such as those described in Patent Application EP-A-0 644 164, the composition of which is recalled below:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 15% |
| $Na_2O$ | 9 to 18% |
| $K_2O$ | 0 to 5% |
| $Fe_2O_3$ (total iron expressed in this form) | 0.75 to 1.4% |
| FeO | 0.25 to 0.32% |
| $SO_3$ | 0.10 to 0.35% |

They may also be glasses such as those described in PCT Application filed under number PCVT/FR95/00828 on Jun. 22, 1995, corresponding to Application FR-A-2 721 599, the composition of which, still in weight percentages, is recalled below:

| | |
|---|---|
| $SiO_2$ | 69 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 17% |
| $K_2O$ | 0 to 8% |
| $Fe_2O_3$ (total iron) | 0.2 to 4% |
| Se, CoO, $Cr_2O_3$, NiO, CuO | 0 to 0.45% |

The content of coloring agents other than iron being at least equal to 0.0002% when the $Fe_2O_3$ content is equal to or lower than 1.5%, it being possible for this composition also to contain fluorine, zinc, zirconium, cerium and titanium oxides and less than 4% of barium oxide, the sum of the percentages of the alkaline-earth metal oxides remaining equal to or lower than 10%.

Still according to the teaching of this patent, it is preferred that the coloring agents other than iron should be introduced into the glass composition by themselves or in combination, according to weight contents which preferably remain lower than the following limits:

| | |
|---|---|
| Se | <0.008% |
| CoO | <0.04% |
| $Cr_2O_3$ | <0.1% |
| NiO | <0.07% |
| CuO | <0.03%. |

They may also be glasses such as those described in Application PCT/FR96/00394 filed on Mar. 14, 1996 and corresponding to the French Patent Application filed on Mar. 16, 1995 under number 95/03858, glasses including, expressed in weight percentages, from 0.85 to 2% of total iron expressed in the $Fe_2O_3$ form, the weight content of FeO being between 0.21 and 0.40%.

According to this patent the compositions are, according to a first series, the following:

| | |
|---|---|
| SiO$_2$ | 64 to 75% |
| Al$_2$O$_3$ | 0 to 5% |
| B$_2$O$_3$ | 0 to 5% |
| CaO | 2 to 15% |
| MgO | 0 to 5% |
| Na$_2$O | 9 to 18% |
| K$_2$O | 0 to 5% |
| Fe$_2$O$_3$ (total iron expressed in this form) | 0.85 to 2% |
| FeO | 0.21 to 0.40% |
| CoO, Cr$_2$O$_3$, Se, TiO$_2$, MnO, NiO, CuO | 0 to 0.04% |
| SO$_3$ | 0.08 to 0.35% | and, according to a second series, the following:

| | |
|---|---|
| SiO$_2$ | 68 to 75% |
| Al$_2$O$_3$ | 0 to 3% |
| B$_2$O$_3$ | 0 to 5% |
| CaO | 2 to 10% |
| MgO | 0 to 2% |
| Na$_2$O | 9 to 18% |
| Fe$_2$O$_3$ (total iron expressed in this form) | 0.95 to 2% |
| CoO, Cr$_2$O$_3$, Se, TiO$_2$, MnO, NiO, Cuo | 0 to 0.04% |
| FeO | 0.29 to 0.40% |
| SO$_3$ | 0.08 to 0.35% |

It may also be a glass tinted in accordance with the teaching of Patent EP-0 452 207, the composition of which is generally the following, in weight proportions:

| | |
|---|---|
| SiO$_2$ | 64 to 75% |
| Al$_2$O$_3$ | 0 to 5% |
| B$_2$O$_3$ | 0 to 5% |
| CaO | 5 to 15% |
| MgO | 0 to 5% |
| Na$_2$O | 10 to 18% |
| K$_2$O | 0 to 5% | the sum of the alkaline-earth metal oxides being between 6 and 16% and those of the alkali metal oxides between 10 and 20% and including, as coloring agents:

| | |
|---|---|
| Fe$_2$O$_3$ (total iron) | 1.4 to 4% |
| CoO | 0 to 0.05% | with CoO>approximately 0.02% when Fe$_2$O$_3$<approximately 2%, as well as optionally selenium and chromium oxide, it being possible for the sum CoO+Se+Cr$_2$O$_3$ to reach 0.24%, this glass having an overall light transmission factor under illuminant A (LT$_A$) equal to or lower than approximately 20% and an overall energy transmission factor (T$_E$) lower than or equal to approximately 12% at a thickness of 3.85 mm.

There may also be mentioned the tinted glasses whose composition corresponds to that defined in Patent WO 93/07095, in the following manner, still in weight proportions:

| | |
|---|---|
| SiO$_2$ | 64 to 75% |
| Al$_2$O$_3$ | 0 to 5% |
| B$_2$O$_3$ | 0 to 5% |
| CaO | 5 to 15% |
| MgO | 0 to 5% |
| Na$_2$O | 10 to 18% |
| K$_2$O | 0 to 5% | and, as coloring agents:

| | |
|---|---|
| Fe$_2$O$_3$ (total iron) | 0.45 to 2.5% |
| CoO | 0.001 to 0.02% |
| Se | 0 to 0.0025% |
| Cr$_2$O$_3$ | 0 to 0.1% | such a glass having an overall energy transmission factor (T$_E$) lower than the light transmission factor under illuminant A (LT$_A$), the factor T$_E$ being between 10 and 48% and the factor LT$_A$ between 20 and 60% at a thickness of 3.85 millimeters.

All these types of tinted glass compositions can therefore be advantageously chosen so that the glazings have energy transmission values of between 6 and 70%, preferably between 20 and 60% and light transmission values of between 10 and 85%, preferably 20 and 75%. These ranges include all values and subranges therebetween.

Another subject-matter of the invention is the use of the glazings described above as glazings for building construction, especially as external glazings, internal partition glazings or glazed doors and as glazings fitted to means of transport, especially motor vehicle glazings such as car roofs, railway glazings or aircraft glazings, especially as windscreens windscreen sunshade strips.

These glazings may have a "monolithic" structure, that is to say with a single rigid substrate, or a plurality of rigid substrates, may have a laminated and/or multiple glazing structure, or else a so-called asymmetric glazing structure with an external plastic layer, based especially on polyurethane with energy-absorption properties, a structure described especially in Patents EP-191 666, EP-190 953, EP-241 337, EP-344 045, EP-402 212, EP-430 769 and EP-673 757.

The glazings of the invention can also be employed as mirrors, by adjusting the nature and the thickness of the reflecting coating, and more particularly as unsilvered mirrors which can also be described as "spy mirrors". If the silvering of the mirror is replaced with a variable light diffusion system of the liquid-crystal type, not only can a viewer in a room observe the interior of an adjacent room without any person present in this adjacent room being aware of this, but in addition the viewer can, if he or she desires, prevent a person entering the room where they find themselves from realizing that it is an unsilvered mirror, by making the glazing diffusing.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

These figures are extremely diagrammatic and do not conform to the proportions of the various components shown, to make them easier to read. In particular, the electrical connections which are generally known in the art are not shown.

EXAMPLES

Having generally described this invention, a further understanding can be obtained by reference to certain specific examples which are provided herein for purposes of illustration only and are not intended to be limiting unless otherwise specified.

The rigid substrates employed for all the following examples are substrates made of silica-soda-lime glass of 4 mm thickness. (Their thickness can in fact be preferably chosen within the range of 3 to 6 mm).

The so-called "clear" glass substrates are glasses marketed by Saint-Gobain Vitrage under the name Planilux. The so-called "tinted" glass substrates are glasses exhibiting, at approximately 4 mm thickness, values of $T_L$ of 35% and of $T_E$ of 18.7% under illuminant $D_{65}$. Their chemical composition is defined by that of Example 2 of the abovementioned Patent WO 93/07095, which includes, in proportion by weight, the following oxides affecting the color:

| | |
|---|---|
| $Fe_2O_3$ (total iron) | 1.65% |
| Co | 0.00110% |

Example 1

Figure 1:
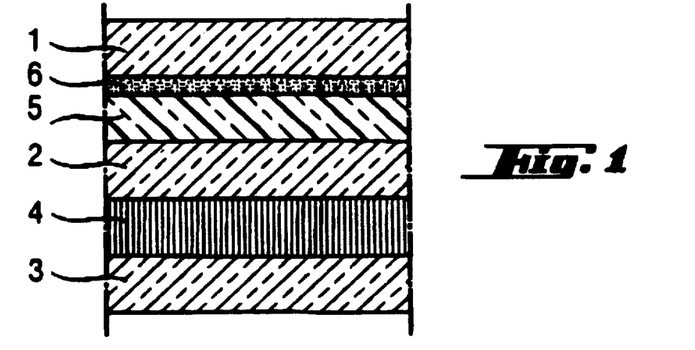
FIG. 1: an electrochromic glazing with laminated structure in section.

FIG. 1 shows an electrochromic glazing of laminated structure containing three glasses in a configuration adapted, for example, to use as a car roof: two clear glasses 2, 3 are shown, between which is placed an electrochromic system 4 consisting of the stack of the following functional layers (stack in accordance with the teaching of EP-0 628 849, the contents of which are hereby incorporated by reference):

- a 300 nm first electroconducive layer of $SnO_2$:F,
- a 55 nm first layer of anodic electrochromic material made of hydrated iridium oxide (it could preferably be replaced with a layer of hydrated nickel oxide).
- a 70 nm layer of hydrated tantalum oxide ($Ta_2O_5 \cdot H_x$), its function being protection.
- a layer of electrolyte as solid solution of polyethylene oxide with phosphoric acid ($PEO-H_3PO_4$), of 100 micrometers,
- a 350 nm second layer of cathodic electrochromic material based on tungsten oxide,
- a 300 nm second layer of $SnO_2$:F.

The glass 2+electrochromic system 4+glass 3 unit is next laminated with a third clear glass 1 through the intermediacy of a sheet 5 of organic bonding polymer of the PVB type from 0.5 to 1 mm in thickness, especially 0.75 mm. On the face of the glass 1 facing the side of the PVB sheet 5 is placed a reflecting coating 6 consisting of the stack of the following thin layers, starting from glass 1:

- a 41 nm layer of $SnO_2$,
- an 18 nm first layer of silver,
- a 74 nm layer of $SnO_2$,
- a 12 nm second layer of silver,
- a 33 nm layer of $SnO_2$.

In addition, on both sides of each of the silver layers is placed a thin metal layer based on NiCr, of approximately 0.5 to 1.5 nm.

This type of stack is, in a conventional manner, obtained by a magnetic field-assisted cathode sputtering technique, the Ni—Cr layers making it possible to protect the silver layers from oxidation during the deposition of $SnO_2$ layers by reactive sputtering in the presence of oxygen, being partially or completely oxidized in their place.

For other types of equivalent stacking of the (dielectric/silver)$_n$ type, with $n \geq 1$, reference will be advantageously made to the patents cited previously. (Thus, dielectric materials other than tin oxide may be employed, for example $TiO_2$, ZnO, Nb, $Ta_2O_5$, $Si_3N_4$, etc. or a superposition of dielectric materials like $SnO_2/Nb_2O_5$, $Nb_2O_5/ZnO$, $SnO_2/Ta_2O_5$, etc. Similarly, the Ni—Cr barrier layers are optional and can be substituted, for example, with layers of metal of the Ti, Ta, Nb, Zn, Sn and similar type).

The above glazing is preferably fitted so that the glass 1 faces outwards to the atmosphere. The electrochromic system 4 is thus protected from solar radiation both by the PVB sheet 4 which, preferably, contains agents that filter out the ultraviolet region, and above all by the reflecting coating 5 according to the invention. This coating, which resorts to two reflecting layers, is particularly effective in its function as a sunlight filter. This is proportionately more important when this glazing is employed as a car roof, that is to say in a horizontal position, which is a configuration particularly stressing the electrochromic system in terms of temperature behavior, or even in a position inclined in relation to the vertical, if the intention is to employ it as greenhouse glazing, roof window of the skylight type, etc.

Example 2

Figure 2:
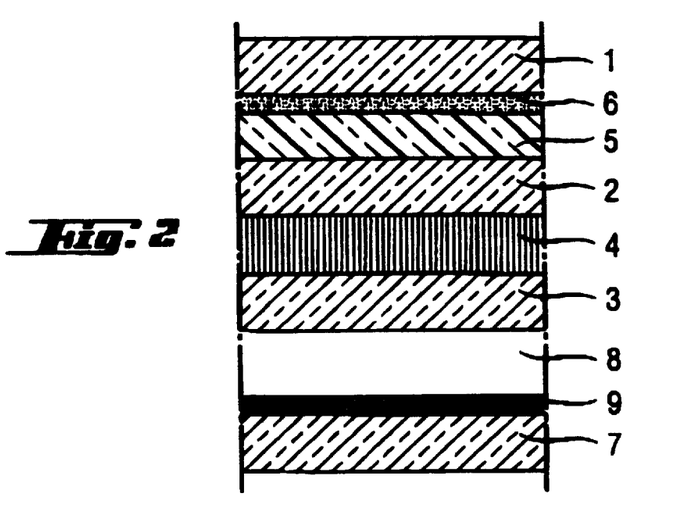
FIG. 2: an electrochromic glazing according to FIG. 1 fitted as double glazing.

Example 2 corresponds to the electrochromic glazing configuration shown in FIG. 2: the glasses 1, 2, 3 of FIG. 1 are seen again, as is the name PVB sheet 5, the same reflecting coating 6 and the same electrochromic system 4. The three-glass unit has been fitted as double glazing with the aid of a fourth clear glass 7 through the intermediacy of a layer of argon 8, 12 mm in thickness, with the aid of means of assembly which are known in the field of double glazing and are not shown.

On the face of the glass 7 facing the argon layer 8 is placed a coating 9 with low-emissivity properties, of the type of those applied to the glazings marketed under the name of Planitherm by Saint-Gobain Vitrage, that is the following stack:

- a 40 nm layer of tin oxide,
- a 9 nm layer of silver,
- a 40 nm layer of tin oxide,
- together with, as in the case of the stack 6 described above, the presence of two thin layers of 0.5 to 1.5 nm of Ni—Cr, intended to protect the silver from oxidation. This type of double glazing can be employed especially as external glazing fitted to building facades (as described in Patent EP-0 575 207, or in greenhouses, verandas or roof windows.

This type of structure results in two advantages; from an aesthetic point of view, when all the glazing of the facade is converted to the colored state, the presence of the reflecting coating 6 gives the facade, on the external side, an aesthetic reflecting appearance, which may be preferred to the relatively dark and absorbent appearance which thin glazing would have when seen from the outside without the reflecting coating in question.

From the point of view of heat protection, the fitting according to FIGS. 1 and 2 protects the electrochromic glazing effectively against excessive heating.

The second coating of the low-emissive type 9 based on a layer of silver (which could, preferably alternatively be made of $SnO_2$:F, for example) does not contribute to the effect of protection against the electrochromic system. It is optional, but its presence makes it possible to improve the thermal insulation properties characteristic of a double glazing structure, especially by reducing its coefficient K (the coefficient K represents the heat flow which passes through 1 $m^2$ of wall with a temperature difference of 1 degree between the opposite sides of the wall, for example, the interior and the exterior of the room).

The spectrophotometric values in the minimum colored state CS and in the maximum faded state FS are collated in Table 1 below for Examples and 2, with reference to the illuminant $D_{65}$: the light transmission $T_L$, the energy transmission $T_E$, the energy absorption EA, in percentages, the coefficient K in $W\ m^{-2}\ °K^{-1}$, the solar factor SF defined by the ratio of the total energy entering the room through the glazing to the incident solar energy, dimensionless.

Also shown in the table are: an Example 2 bis, corresponding to the configuration of Example 2 but devoid of the low-emissive coating 9, and an Example 2ter which, by way of comparison, also corresponds to the configuration of Example 2, but is devoid of the reflecting coating 6 according to the invention.

TABLE 1

|       | Example 1 |      | Example 2 |      | Example 2BIS |      | Example 2TER |      |
|-------|-----------|------|-----------|------|--------------|------|--------------|------|
|       | CE        | FE   | CE        | FE   | CE           | FE   | CE           | FE   |
| $T_L$ | 10        | 48.4 | 8.5       | 41.5 | 9.1          | 44.2 | 10.2         | 50   |
| $T_E$ | 4.9       | 25.2 | 4.0       | 19.8 | 4.4          | 22.2 | 5.3          | 29.2 |
| EA    | 58.8      | 38.4 | 59.0      | 39.8 | 59.1         | 39.5 | 84.2         | 53.7 |
| SF    | 0.20      | 0.36 | 0.08      | 0.25 | 0.12         | 0.28 | 0.11         | 0.37 |
| K     | 5.6       | 5.6  | 1.4       | 1.4  | 2.6          | 2.6  | 1.4          | 1.4  |

From this table it is seen that the elimination of the low-emissive stack 9 in Example 2bis, compared with Example 2, increases the minimum value of $T_L$ of the glazing by 3% without affecting its energy absorption, but slightly to the cost of the coefficient K and of the solar factor SF. The choice of any one of the configurations will depend on the intended application, the climate, etc.

When Examples 2 and 2ter are compared, it can also be seen that the presence of the reflecting coating in Example 2 does not impair the contrast and only very slightly impairs the light transmission of the glazing, but it makes it possible to reduce the energy absorption very significantly.

Furthermore, for each of the configurations of the Examples 1 and 2, the maximum surface temperature of the glazings was measured in comparison with identical glazings devoid of the protective coating 6; when the latter are subjected, in horizontal position, to an exposure to sunlight corresponding to an energy of 850 $W/m^2$, it is found that the maximum temperature of the glazings according to Examples 1 and 2, in the colored state, is at most 69° C., whereas it is 83° C. in the absence of coating 5. This difference of 14° C. is far from insignificant, because it allows the lifetime of the electrochromic glazings to be increased.

It should be noted, furthermore, that if an "all-solid" electrochromic system 4 is chosen, it is possible to have a "lighter" double glazing structure than that shown in FIG. 2, especially of the glass 1/electrochromic system/gas layer/glass 2 type; the reflecting coating can then be placed on the external face of the glass 1, if it has the required durability, for example, if it is $TiO_2$ based, similar to the coating with which glazings marketed under the name of Antelio by Saint-Gobain Vitrage are provided.

Example 3

Figure 3:
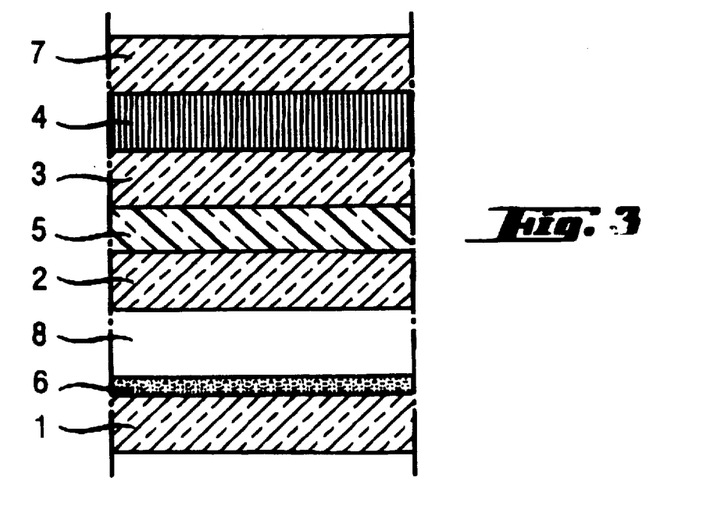
FIG. 3: an electrochromic glazing fitted as double glazing according to another configuration.

Example 3 corresponds to the configuration of FIG. 3, which shows an electrochromic double glazing which has the same components (but is devoid of the low-emissive stack 9) as that in FIG. 2, assembled differently.

Glass 1, which faces outwards once the glazing is fitted, carries only the reflecting coating 6 and is not laminated. The electrochromic system 4 is therefore between the glasses 7 and 3, the glass 3 being laminated to glass 2 through the intermediacy of the PVB sheet 5. The unit of the glasses 2, 3 and 7 is next fitted as double glazing via an argon layer 8 with the glass 1 carrying the reflecting coating 6 on its face facing the argon layer.

Many other alternative forms of electrochromic glazings in accordance with the invention are possible, as already mentioned above. It is thus possible to have the configuration of Example 3, but eliminating the glass 2 and the PVB sheet 5, thus avoiding laminating glass 3.

If an "all-solid" electrochromic system 4 is adopted, for example exhibiting the following stack:

a 300 nm electrically conductive layer of $SnO_2$:F, a 380 nm layer of cathodic electrochromic material made of tungsten oxide, a double layer electrolyte made up of an 18 nm layer of hydrated tantalum oxide $Ta_2O_5\ nH_2O$ and a 200 nm layer of hydrated tungsten oxide $WO_3\ nH_2O$, a 45 nm layer of anodic electrochromic material based on hydrated iridium oxide $H_xIrO_y$ (it can preferably be replaced with hydrated nickel oxide), a 200 nm electrically conductive layer of ITO, then it is possible to have a double glazing structure with only two glasses, of the glass 1/reflecting coating 6/gas layer 8/electrochromic system 4/glass 2 type.

The following Examples 4 and 6 refer to a liquid-crystal glazing.

Example 4

Figure 4:
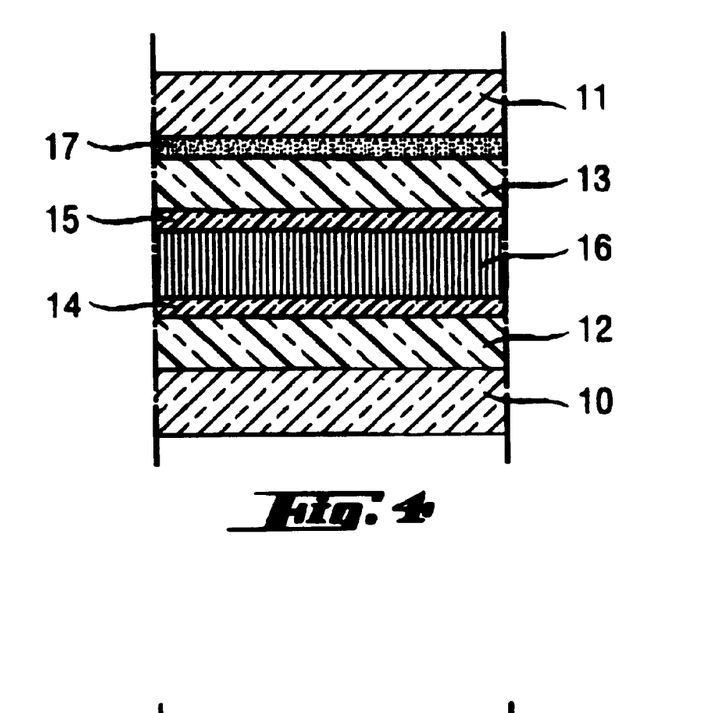
FIG. 4: a liquid-crystal glazing in section.

Example 4 refers to a liquid-crystal glazing as shown in FIG. 4:

It includes two clear glasses 10, 11, between which are placed two 0.75 mm sheets of PVB 12, 13, surrounding two sheets of polyethylene terephthalate PET 14, 15, 175 micrometers in thickness, between which is the liquid-crystal system 16, 25 micrometers in thickness. In fact, the manufacture is done in two steps, firstly the manufacture of the PET/ITO/polymer-liquid crystal composite/ITO/PET film, a film which is next laminated to the glasses 10 and 11 with the aid of the sheets 12 and 13.

In addition, between the glass 11 and the PVB sheet 13 there is a reflecting coating 17 similar to the reflecting coating 5 with two layers of silver, but with different thicknesses of silver layers, the stack 17 is as follows (in accordance with the teaching of the European Patent EP-638 528.

a 34.4 nm layer of $SnO_2$, a 12 nm first layer of silver, a 98 nm layer of $SnO_2$, an 18 nm second layer of silver, a 35 nm layer of $SnO_2$.

In addition, on each side of each of silver layers in placed a thin metal layer of approximately 1.5 nm of Nb.

The liquid-crystal system 16 comprises two transparent conducting layers of ITO of resistivity 100 ohms per square, deposited on each of the PET sheets, between which is a transparent polymer-liquid crystal composite consisting of a polymer in which microdrops of nematic liquid crystals have been dispersed beforehand, which forms the liquid-crystal emulsion. The liquid-crystal system employed is of the type of those described in Patents WO-90/03593, U.S. Pat. No. 5,206,747 and EP-0 409 442, and marketed by Saint-Gobain Vitrage under the name Priva-lite. It operates at the voltage of 110 V/50 Hz: when supplied with electricity it is transparent. It becomes diffusing when the electrical supply is cut off. It should be noted that if dichroic dyes are introduced into the droplets of liquid crystals, the coating 17 serves at least partially as an ultraviolet filter protecting them. This ultraviolet effect can be reinforced by employing, on the outside, a glass with an anti-ultraviolet filter effect.

Example 5

Example 5 also relates to a liquid-crystal glazing of the type shown in FIG. 4, with the same PET/ITO/polymer-liquid crystal composite/PET/ITO liquid-crystal system 14, 15, 16 and the same reflecting coating 17. Here, on the other hand, the glare 11 is only 2 mm in thickness and the second glass 10 is a glass tinted in bulk as defined above, 4 mm in thickness. In addition, the PVB sheets 12, 13 are replaced with 0.65 mm sheets made of polyurethane.

The following photometric values, still under the illuminant $D_{65}$ and with reference to ISO standard 9050 are collated in the Tables 3 and 4 below, for Examples 4 and 5 respectively: $T_L$ the light transmission in %, lambda dom (T) the dominant transmission wavelength in nm, pe (T) the transmitted color purity in %, $T_E$ the energy transmission in %, the substrate 11 "side" light reflection $R'_L$, and its dominant wavelength and its purity lambda dom ($R_L$) and pe ($R_L$), the substrate 10 "side" light reflection $R'_L$, and its dominant wavelength and its purity lambda dom ($R'_L$) and pe ($R'_L$). Also given are the solar factors SF, already explained, as well as the values of energy absorption EA and of haze H, defined by the light diffusion ratio in %. All these data are shown in the "ON" state, that is, in the transparent state when the glazing is supplied with electricity, and in the "OFF" state, that is to say when the glazing is no longer supplied with electricity and is diffusing.

TABLE 3

EXAMPLE 4

|  | "ON" | "OFF" |
|---|---|---|
| $T_L$ | 37.6 | 33.8 |
| lambda dom (T) | 571 | 559 |
| pe (T) | 18.17 | 9.15 |
| $R_L$ | 15.45 | 14.8 |
| lambda dom ($R_L$) | 485 | 485 |
| pe ($R_L$) | 32.1 | 32.2 |
| $R'_L$ | 22.5 | 20.65 |
| lambda dom ($R'_L$) | 480 | 480 |
| pe ($R'_L$) | 8.94 | 7.92 |
| EA | 48.75 | 52.3 |
| SF | 30.5 | 28.7 |
| H | <8 | >97 |
| $T_E$ | 19.03 | 16.02 |

By way of comparison, the spectrophotometric values of a glazing of configuration identical with that of the glazing of Example 4 but devoid of the reflecting coating 17 according to the invention were measured: such a glazing has an $R_L$ value identical with that of $R'_L$ and equal to 18.4% in the "ON" state and to 16.5% in the "OFF" state. Similarly, the dominant wavelengths of the references $R_L$ and $R'_L$ are identical and equal to 491 nm, whether the glazing is in the "OFF" state or in the "ON" state. The purity values associated with the reflections $R_L$ and $R'_L$ are also identical, and equal to 5.2% whether the glazing is in the "OFF" state or in the "ON" state Its solar factor SF is 67 in the "ON" state and 65 in the "OFF" state. Its light transmission is 73.5% in the "ON" state and 70.8% in the "OFF" state, associated with a dominant wavelength which in always equal to 569 nm and a purity which is always equal to 4.3–4.4%.

TABLE 4

EXAMPLE 5

|  | "ON" | "OFF" |
|---|---|---|
| $T_L$ | 15.7 | 14.6 |
| lambda dom (T) | 528 | 525 |
| pe (T) | 8.9 | 8.7 |
| $R_L$ | 16.0 | 16.3 |
| lambda dom ($R_L$) | 486 | 486 |
| pe ($R_L$) | 30.0 | 29.7 |
| $R'_L$ | 7.8 | 7.2 |
| lambda dom ($R'_L$) | 490 | 491 |
| pe ($R'_L$) | 12.1 | 10.3 |
| EA | 58.3 | 58.9 |
| SF | 22 | 21.5 |
| H | <8 | >97 |
| $T_E$ | 6 | 5.3 |

The following conclusions may be drawn from these data: the $T_L$ and $T_E$ level can be preferably adjusted through the choice of the substrates, glassy, clear or tinted. The reflecting coating 17 forms a thermal screen, if necessary, for the liquid crystal system. Above all, it is now possible to obtain reflection appearances on the external side (glass 11) and internal side (glass 10) which are different, with, for example, nearly 10% difference between the values of $R_L$ and $R'_L$, and a color purity in external reflection which is more than twice as high as in internal reflection; there is a clear reflecting effect, with an intense color in the blue or blue-green region when the glazing is viewed from the outside, an effect which is much less marked when the glazing is viewed from the inside. It has been possible to verify that, in the absence of a reflecting coating, the glazing has absolutely identical appearances in internal and external reflection, the appearance of the glazing in the "ON" state being white and milky on each side.

Finally, from Table 4 it is seen that the use of tinted glass allows the internal reflection value $R'_L$ to be lowered.

With this type of glazing it is therefore possible to modulate its light diffusion so that a room or a compartment is protected from external viewing. In addition, the external viewer will see the reflecting glazing with a pleasant tint, regardless of whether it is in the diffusing state or not, an aesthetic external appearance which is quite sought after at present.

The invention thus makes it possible to adjust colorimetrically the external reflection appearance of a liquid-crystal glazing, with a very special advantage that when this type of glazing is fitted to vehicles, it is then possible to adjust the appearance of the glazing seen from the outside as a function, for example, of the color of the bodywork.

Example 6

Figure 5:
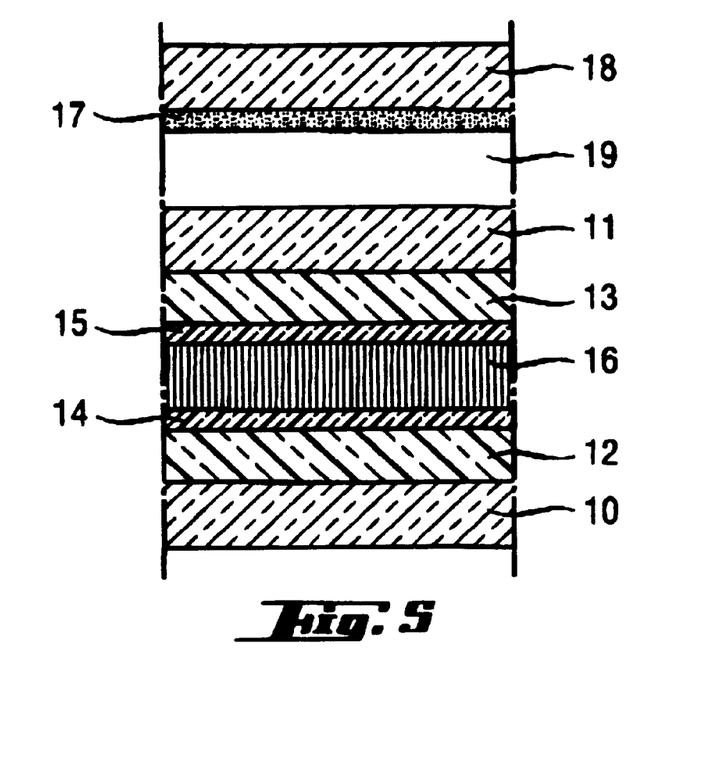
FIG. 5: a liquid-crystal glazing fitted as double glazing.

Example 6 corresponds to FIG. 5, which shows a liquid-crystal glazing of the type of that in FIG. 4, this time fitted as double glazing: the glass 10/PVB 12/PET 14/liquid-crystal system 16/PET 15/PVB 13/glass 11 laminated structure is found again, a structure which is laminated to a third clear glass 18 through the intermediacy of an argon layer 19 and carrying, on the side of its face facing the argon layer, the reflecting coating 17. Glass 18 is intended to face outwards once the glazing is fitted.

Furthermore, the glazings as described in all of the above examples can be functionalized, for example by having, on external face(s), an antisoiling coating, for example of at least partially crystallized $TiO_2$, as referred to above, or an antirain hydrophobic coating based on fluorinated silane polymer.

Obviously, numerous modifications and variations of the present invention are possible in light of the above teachings. It is therefore to be understood that within the scope of the appended claims, the invention may be practiced otherwise than as specifically described herein.

This application is based on French Patent Application FR96/10344, filed Aug. 22, 1996, the entire contents of which are hereby incorporated by reference.

What is claimed as new and desired to be secured by Letters Patent of the United States is:

1. A transparent glazing, comprising:
    at least one active layer, and
    at least one reflecting coating on said active layer,
    wherein said at least one active layer comprises at least one optically variable layer selected from the group consisting of an electrically controllable system and a photochromic system,
    wherein said reflecting coating acts as a heat filter or a thermal screen, and comprises at least one reflecting layer that comprises at least one member selected from the group consisting of Ag, Au, Cu, Al, Cr, Ni, Fe, Ta, Zn, Zr, Sn, In, Rh, Cd, TiN, ZrN, HfN, and a mixture thereof, and
    wherein said at least one active layer and said at least one reflecting layer are separated by at least one substrate layer, and
    (1) wherein said at least one active layer and said at least one reflecting layer is separated by a gas interlayer, or
    (2) wherein said electrically controllable system is laminated to a single transparent rigid carrier substrate, and wherein said glazing further comprises at least one other rigid substrate and a gas layer, wherein said gas layer is between the two rigid substrates, or
    (3) wherein said glazing comprises the following layers in the order sequence:
        glass/reflecting coating/sheet of bonding polymer/glass/electrically controllable system/glass/gas interlayer/glass.

2. The glazing according to claim 1, wherein said coating comprises at least one reflecting layer, and at least one layer of dielectric material.

3. The glazing according to claim 1, wherein said coating comprises at least one reflecting layer that comprises at least one metal oxide or doped metal oxide.

4. The glazing according to claim 1, wherein said electrically controllable system comprises an electrochromic system, and said electrochromic system comprises a stack of one or more functional layers selected from the group consisting of an electrically conductive layer, a cathodic electrochromic layer capable of reversibly inserting cations, an electrolyte layer, and an anodic electrochromic layer capable of reversibly inserting cations.

5. The glazing according to claim 4, wherein said electrolyte layer comprises an electrolyte material selected from the group consisting of aqueous liquid, anhydrous liquid, solid electrolyte, polymers, and gels.

6. The glazing according to claim 5, wherein said solid electrolyte comprises a metal oxide.

7. The glazing according to claim 1, further comprising a second transparent rigid carrier substrate, and said electrically controllable system is placed between the two transparent rigid carrier substrates.

8. The glazing according to claim 1, wherein said carrier substrate is laminated to another rigid substrate with a sheet of bonding polymer selected from the group consisting of PVB, EVA and PU.

9. The glazing according to claim 8, further comprising a sheet of bonding polymer and glass sheets bonded together in the order sequence: glass/reflecting coating/sheet of bonding polymer/glass/electrically controllable system/glass.

10. The glazing according to claim 1,
    wherein said electrically controllable system is laminated to a single transparent rigid carrier substrate, and wherein said glazing further comprises at least one other rigid substrate and a gas layer, wherein said gas layer is between the two rigid substrates.

11. A pane, partition, mirror, or door, comprising:
    the transparent glazing of claim 1.

12. The glazing according to claim 1, comprising the following layers in the order sequence:
    glass/reflecting coating/sheet of bonding polymer/glass/electrically controllable system/glass/gas interlayer/glass.

13. The glazing according to claim 1, wherein said at least one active layer and said at least one reflecting layer is separated by a gas interlayer.

* * * * *